US007843998B2

(12) United States Patent
Bjøntegaard

(10) Patent No.: US 7,843,998 B2
(45) Date of Patent: Nov. 30, 2010

(54) METHOD FOR IMPROVED ENTROPY CODING

(75) Inventor: Gisle Bjøntegaard, Oppegård (NO)

(73) Assignee: Tandberg Telecom AS, Lysaker (NO)

( * ) Notice: Subject to any disclaimer, the term of this patent is extended or adjusted under 35 U.S.C. 154(b) by 1347 days.

(21) Appl. No.: 11/316,931

(22) Filed: Dec. 27, 2005

(65) Prior Publication Data

US 2006/0146938 A1    Jul. 6, 2006

(30) Foreign Application Priority Data

Dec. 30, 2004    (NO) ................................. 20045714

(51) Int. Cl.
*H04N 7/12* (2006.01)
*H04N 11/02* (2006.01)
*H04N 11/04* (2006.01)

(52) U.S. Cl. ........................... 375/240.23; 375/240.24; 375/E7.144; 375/E7.047

(58) Field of Classification Search ............... 341/59, 341/65; 375/240.23, 240.24, 240.18, E7.144, 375/E7.047, 240.25; 382/244, 245, 246
See application file for complete search history.

(56) References Cited

U.S. PATENT DOCUMENTS

| 6,646,578 | B1  |   | 11/2003 | Au |            |
|-----------|-----|---|---------|----|------------|
| 7,006,631 | B1  | * | 2/2006  | Luttrell et al. | 375/E7.144 |
| 7,203,372 | B1  | * | 4/2007  | Chen et al. | 375/E7.144 |
| 7,439,883 | B1  | * | 10/2008 | Moni et al. | 375/240.23 |
| 2004/0228540 | A1 |   | 11/2004 | Chen |         |
| 2006/0039621 | A1 | * | 2/2006  | Toebes et al. | 382/245 |
| 2006/0056720 | A1 | * | 3/2006  | Chen et al. | 382/245 |
| 2006/0126743 | A1 | * | 6/2006  | Takekawa et al. | 375/240.23 |
| 2007/0104381 | A1 | * | 5/2007  | Chen et al. | 382/245 |
| 2007/0133890 | A1 | * | 6/2007  | Chen et al. | 382/244 |
| 2007/0165724 | A1 | * | 7/2007  | Chen et al. | 375/240.25 |

OTHER PUBLICATIONS

Amer, et al., "Towards MPEG-4 Part 10 System on a Chip: a VLSI Prototype for Context-Based Adaptive Variable Length Coding (CAVLC)", Signal Processing Systems, 2004. IEEE Workshop on Austin, TX Oct. 13, 2004, pp. 275-279.
Wu Di, et al, "A VLSI Architecture Design of CAVLC Decoder", ASIC, 2003, Proceeding 5th Intl Conference, Oct. 21-24, 2003 pp. 962-965.
Bjontegaard, et al, "Context-Adaptive VLC (JVT) Coding Coefficients", Joint Video Team (JVT) of ISO/IEC MPEG/ITU VCEG, May 6, 2002, pp. 1-11.

* cited by examiner

*Primary Examiner*—Twyler L Haskins
*Assistant Examiner*—Nicholas C Pachol
(74) *Attorney, Agent, or Firm*—Oblon, Spivak, McClelland, Maier & Neustadt, L.L.P.

(57) ABSTRACT

The invention is related to entropy coding/decoding of transform coefficient data in video compression systems. For entropy coding coefficients representing a block in a video image, a preferred embodiment of the present invention introduces events combining the position of the last non-zero coefficient in the block with whether the absolute value is greater than 1. Further, no information from outside the macroblock is used to decide what VLC to use. Coefficients are typically coded by starting in a Run-mode and continuing in Level-mode when the first coefficient with absolute value >1 is found.

10 Claims, 4 Drawing Sheets

Y

Cr　　　Cb

Y0　| 0 | 1 |　| 0 | 1 | Y1　| 0 | 1 |　| 0 | 1 |
　　| 3 | 2 |　| 3 | 2 |　　　| 3 | 2 |　| 3 | 2 |

Y2　| 0 | 1 |　| 0 | 1 | Y3
　　| 3 | 2 |　| 3 | 2 |

US 7,843,998 B2

METHOD FOR IMPROVED ENTROPY CODING

FIELD OF THE INVENTION

The invention is related to entropy coding/decoding of transform coefficient data in video compression systems.

BACKGROUND OF THE INVENTION

Transmission of moving pictures in real-time is employed in several applications like e.g. video conferencing, net meetings, TV broadcasting and video telephony.

However, representing moving pictures requires bulk information as digital video typically is described by representing each pixel in a picture with 8 bits (1 Byte). Such uncompressed video data results in large bit volumes, and can not be transferred over conventional communication networks and transmission lines in real time due to limited bandwidth.

Thus, enabling real time video transmission requires a large extent of data compression. Data compression may, however, compromise with picture quality. Therefore, great efforts have been made to develop compression techniques allowing real time transmission of high quality video over bandwidth limited data connections.

In video compression systems, the main goal is to represent the video information with as little capacity as possible. Capacity is defined with bits, either as a constant value or as bits/time unit. In both cases, the main goal is to reduce the number of bits.

The most common video coding method is described in the MPEG* and H.26* standards. The video data undergo four main processes before transmission, namely prediction, transformation, quantization and entropy coding.

The prediction process significantly reduces the amount of bits required for each picture in a video sequence to be transferred. It takes advantage of the similarity of parts of the sequence with other parts of the sequence. Since the predictor part is known to both encoder and decoder, only the difference has to be transferred. This difference typically requires much less capacity for its representation. The prediction is mainly based on vectors representing movements. The prediction process is typically performed on square block sizes (e.g. 16×16 pixels). Note that in some cases, predictions of pixels based on the adjacent pixels in the same picture rather than pixels of preceding pictures are used. This is referred to as intra prediction, as opposed to inter prediction.

The residual represented as a block of data (e.g. 4×4 pixels) still contains internal correlation. A well-known method of taking advantage of this is to perform a two dimensional block transform. In H.263 an 8×8 Discrete Cosine Transform (DCT) is used, whereas H.264 uses a 4×4 integer type transform. This transforms 4×4 pixels into 4×4 transform coefficients and they can usually be represented by fewer bits than the pixel representation. Transform of a 4×4 array of pixels with internal correlation will probability result in a 4×4 block of transform coefficients with much fewer non-zero values than the original 4×4 pixel block.

Direct representation of the transform coefficients is still too costly for many applications. A quantization process is carried out for a further reduction of the data representation. Hence the transform coefficients undergo quantization. A simple version of quantisation is to divide parameter values by a number—resulting in a smaller number that may be represented by fewer bits. It should be mentioned that this quantization process has as a result that the reconstructed video sequence is somewhat different from the uncompressed sequence. This phenomenon is referred to as "lossy coding". The outcome from the quantisation part is referred to as quantized transform coefficients.

Entropy coding implies lossless representation of different types of parameters such as overhead data or system description, prediction data (typically motion vectors), and quantized transform coefficients from the quantisation process. The latter typically represent the largest bit consumption.

The coding is performed on block wise parts of the video picture. A macro block consists of several sub blocks for luminance (luma) as well as for chrominance (chroma). There are typically two chrominance components (Cr, Cb) with half the resolution both horizontally and vertically compared with luminance. In FIG. 1, the macro block consists of 16×16 luminance pixels and two chrominance components with 8×8 pixels each. Each of the components is further broken down into 4×4 blocks, which are represented by the small squares. For coding purposes, both luma and chroma 4×4 blocks are grouped together in 8×8 sub blocks and designated Y0-Y3 and Cr, Cb.

H.263 and H.264 describe the prior art entropy coding of quantized transform coefficients in video compression.

H.263 is based on Variable Length Coding (VLC). A set of events is defined. An event represents fixed values for one or more parameters. An event is allocated a unique bit code. The code table is designed such that the length of the codes match the statistical probability of each event. Optimum efficiency is obtained if Bit_number=−log 2(p), where p is the statistical probability of the event (p is in the range 0-1). An example of a VLC code is shown in table 1.

In H.264, improved methods are introduced, i.a. the concept of "Context Adaptivity" (CA). The concept applies a dynamically changed model based on previous coding. As an example, a more suitable VLC table may be chosen based on the occurrence of previous events and thereby make the coding more efficient. Two such CA based methods are disclosed in H.264:

1 CAVLC with moderate Context Adaptivity that use VLC tables for coding.
2 CABAC (Binary Arithmetic Coding) with more complex Context Adaptivity and using arithmetic coding at the end. This result in largest compression gain—but at a price of higher complexity.

CAVLC is considered to have a moderate adaptivity and complexity. CABAC uses more elaborate adaptivity but is considered as being too complex for certain applications, in particular for real time applications.

SUMMARY OF THE INVENTION

It is an object of the present invention to provide an improved entropy coding method compared to the state of the art balancing low complexity with high performance. The features defined in the independent claim 1 enclosed characterise this method.

It is another object of the present invention to provide an improved entropy decoding method compared to the state of the art balancing low complexity with high performance. The features defined in the independent claim 5 enclosed characterise this method.

BRIEF DESCRIPTION OF THE DRAWINGS

In order to make the invention more readily understandable; the discussion that follows will refer to the accompanying drawings and tables.

DETAILED DESCRIPTION OF THE PRESENT INVENTION

The present invention provides a method of coding/decoding quantized transform coefficients in blocks that are known to have nonzero transform coefficients. However, for a better understanding of the invention, coding of information concerning which blocks that have coefficients or not, often referred to as Coded Block Pattern (CBP), will in the following be described by example.

Figures 1, 2:
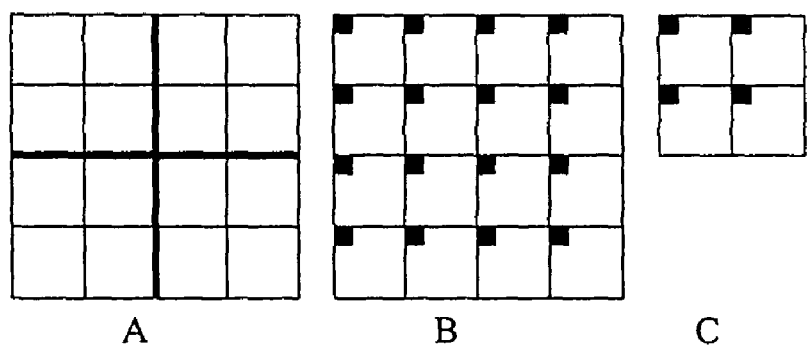
FIG. 1 shows how a macro block of 16×16 luma pixels and two chroma components with 8×8 pixels.
FIG. 2 illustrates examples of different Coded Block Patterns.

In FIG. 2 is shown different block types typically used in CBP. Block A is 16×16 luma block divided into 16 4×4 blocks which undergo a 2-dimensional transform. The black lines in A indicate that there is also a partition of the 16×16 block into four 8×8 blocks. Each 4×4 block will have 16 transform coefficients. Non-zeros are coded as follows: one bit indicates if there is non-zero coefficients in the whole 16×16 block or not. In case there are coefficients additionally one bit pr 8×8 block indicates non-zero coefficients or not. In case there are coefficients, there is additionally one bit pr 4×4 block to indicate non-zero coefficients or not.

Block B has the same partition as A. The black squares indicate DC coefficients in a 4×4 block. They undergo a second 4×4 transform to form a separate 4×4 block. This block has 16 transform coefficients, whereas the other blocks will have 15 coefficients since the dc coefficients are shifted to the DC-block. Block B is a special type of intra block. One bit indicates if there is non-zero coefficients in the 4×4 DC transform. Another bit indicates if there are non-zero AC coefficients in the whole 16×16 block or not. In case there are coefficients, additionally one bit pr 4×4 block indicates if there are non-zero AC coefficients or not.

Block C is a 8×8 luma block divided into four 4×4 blocks which undergo a 2-dimensional transform. The black squares indicate DC coefficients in a 4×4 block. They undergo a second 2×2 transform to form a separate 2×2 block. This block has four coefficients, whereas the other blocks will have 15 coefficients since the dc coefficients are shifted to the DC-block. This is one of 2 chrominance coefficients.

A similar structure to the one for block b may be used taking into account that there are 2 chrominance components and that it is desirable to have a 1 bit indication if there are non-zero chrominance coefficients at all in the blocks.

The present invention has some similarities to the above-mentioned prior art Context Adaptive Variable Length Coding (CAVLC), as mentioned in the background section. In the following, the basics of the CAVLC coding according to H.264 will be described.

During the coding there is a prediction process to predict pixel values in each of the blocks. This is subtracted pixel wise from the pixel data to be coded and the result is a so-called residual signal.

To achieve further compression, the residual signal undergoes a 4×4 transformation resulting in 4×4=16 transform coefficients. They are organized as a string of 16 numbers so that statistically the size of the coefficients decreases as the position in the string increases. To obtain the required compression, the transform coefficients further undergo a quantization process before entropy coding. This typically results in most of the coefficients being 0. A typical string of quantized transform coefficients may look like this:

$$6 \; -4 \; 0 \; 2 \; 0 \; 0 \; -1 \; 0 \; 0 \; 1 \; 0 \; 0 \; 0 \; 0 \; 0 \; 0 \quad (1)$$

Before the actual CAVLC coding a CBP8 coding is carried out specifying which of the 8×8 blocks (in FIG. 3 marked in bold) have transform coefficients and which have not.

Figure 3:
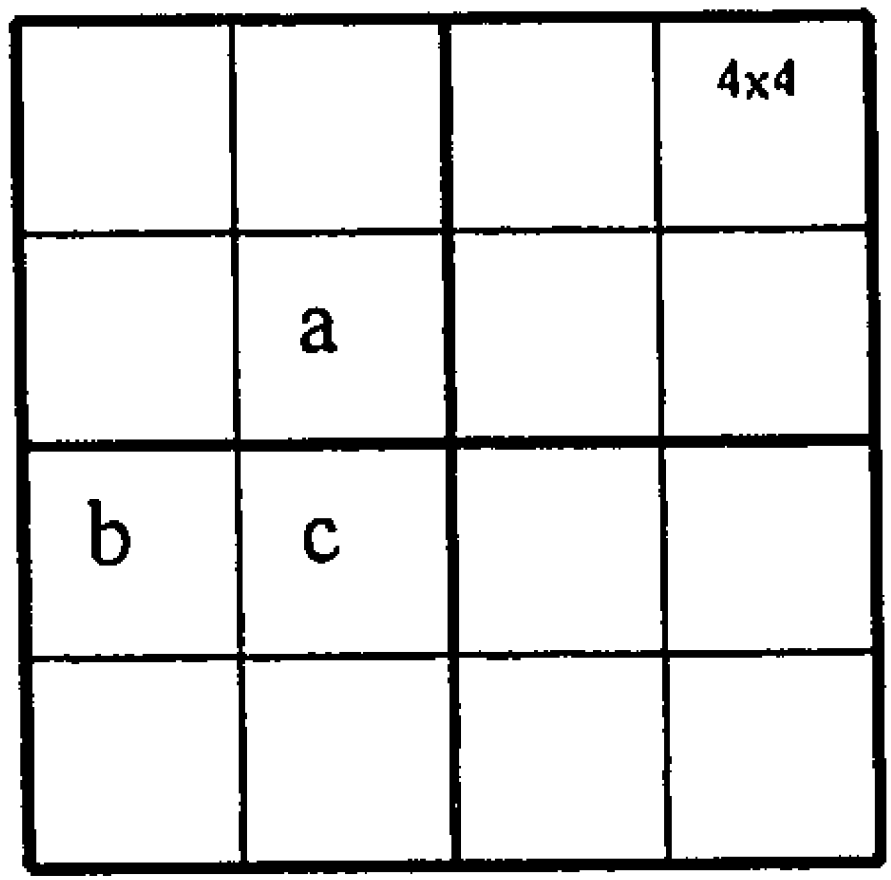
FIG. 3 shows a block and its neighbours within a macroblock to be coded.

In describing the CAVLC coding, the quantized transform coefficients of block c in FIG. 3 including the coefficients (1) are used as an example.

The first step is to code a combined parameter representing the combination of the number of nonzero coefficients (N) and the number of coefficients towards the end having absolute value of 1. In the above example, this parameter is (5,2). If all the coefficients were 0, the combination would be (0,0). This parameter is coded with a Variable Length Code (VLC) code table. In order to increase compression different VLC tables can be chosen depending on the value of N in the 4×4 blocks a and b above and to the left.

To this point, it is already specified that the two last coefficients have absolute value 1. The next step is then to specify the remaining ones: 6, −4, 2. In this process "reverse order scanning" is used. This means that the coefficients are coded in the order: 2 −4 6. This is done because VLC tables may be changed depending on the size of the previously coded coefficient. In the example a "starting" VLC is used to code 2 and 4. Since 4 is above a defined threshold, a different VLC is used to code 6.

For each nonzero coefficient one bit further indicates whether the coefficient is positive or negative.

Next, the number of zero coefficients (TZ) before the last nonzero coefficient is coded. In the example above TZ=5. N sets an upper limitation on TZ. Hence a suitable VLC table depending on N is chosen.

Finally, the actual distribution of 0-coefficients are coded, which is also done by scanning in reverse order. It is therefore specified that there are two 0-coefficients before the last 1. It is already known that there are totally five 0-coefficients, and a suitable VLC table is used. Then the two 0-coefficients before −1 and the one 0-coefficients before 2 are coded. Then the position of all nonzero and zero coefficients are then completely specified.

As prior art CAVLC specifies the number of non-zero coefficients combined with the number of 1's in a 4×4 block, the present invention introduce events combining the position of the last non-zero coefficient with whether the absolute value is greater than 1. Further, no information from outside the macroblock is used to decide what VLC to use. Coefficients are typically coded by starting in a Run-mode and continuing in Level-mode when the first coefficient with absolute value >1 is found. An example of RUN and LEVEL is shown in table 2 and 3, respectively.

One embodiment of the present invention will now be described by referring to FIG. 3 and the coefficients of (1). Note that even if only coding is described here, the present invention also applies for decoding, but then inversely carried out.

After quantization of the transform coefficients in a block, the coefficients are represented by so-called LEVEL values which may be 0, ±1, ±2 etc. The absolute value of LEVEL is called ALEVEL, and the sign of LEVEL (+ or −) is called SIGNLEVEL.

As already indicated, the present invention starts in a more direct way than prior art CAVLC to define the position (P) of the last coefficient numbered 0-3, 0-14 or 0-15 depending of the number of coefficients in the block, i.e. depending on which of the CBP shown in FIG. 2 is being used. A combined event is coded indicating both P and whether ALEVEL of the last coefficient=1 or >1. In the case of (1), the event is (9, =1).

For better compression, a VLC table is chosen depending on P of blocks a and b but only if they are inside the macroblock. This represents a simplification since the encoding/decoding can be macroblock based, which makes reading data connected to other macroblocks unnecessary.

Further according to the embodiment of the present invention, which VLC to be used depends on the size of the block to avoid reserving codes for values of P or ALEVEL that cannot occur, and the value of P in blocks a and b. However, the dependence on a and b only occur if the they are within the same macroblock as the 4×4 block to be coded.

As for prior art CAVLC, reverse order scanning is used. If ALEVEL of the last coefficient is 1, the coding is further continued in run-mode.

Referring now to the example, the number of 0-coefficients (R) before the last 1 (R=2) is coded. It is coded in combination with an indication of whether the absolute value of the next coefficient (Next) is 1 or >1. In this case, the next coefficient is 1.

Depending on the position of the last coded coefficient, the possible values of the following RUN is limited. As an example: If the last coded coefficient was in position 4, values of RUN can be in the range 0-4. Hence, a VLC table is needed that allows only five RUN values to be coded, as the value 1 is excluded. This is utilized in the design.

According to the embodiment of the invention, ALEVEL is coded directly (including the value 0). In the example above the codes are:

ALEVEL=2 (knowing that it is >1)

ALEVEL=0

ALEVEL=4

ALEVEL=6

Note that as for prior art CAVLC, VLC tables may be changed depending on the size of the previously coded coefficient. As an example, in the adaptation procedure used in H.264 level coding, there are 6 different VLC tables available called VLCn where n=0, 1, 2, 3, 4, 5. At the beginning of a block n is set equal to 0. For each coded coefficient, n to be used for coding the next coefficient may be changed in the following way:

if ALEVEL>$3*2^n$, n is increased by 1, but cannot exceed 5.

Finally, for each nonzero coefficient one bit indicates whether the coefficient is positive or negative.

Figure 4:
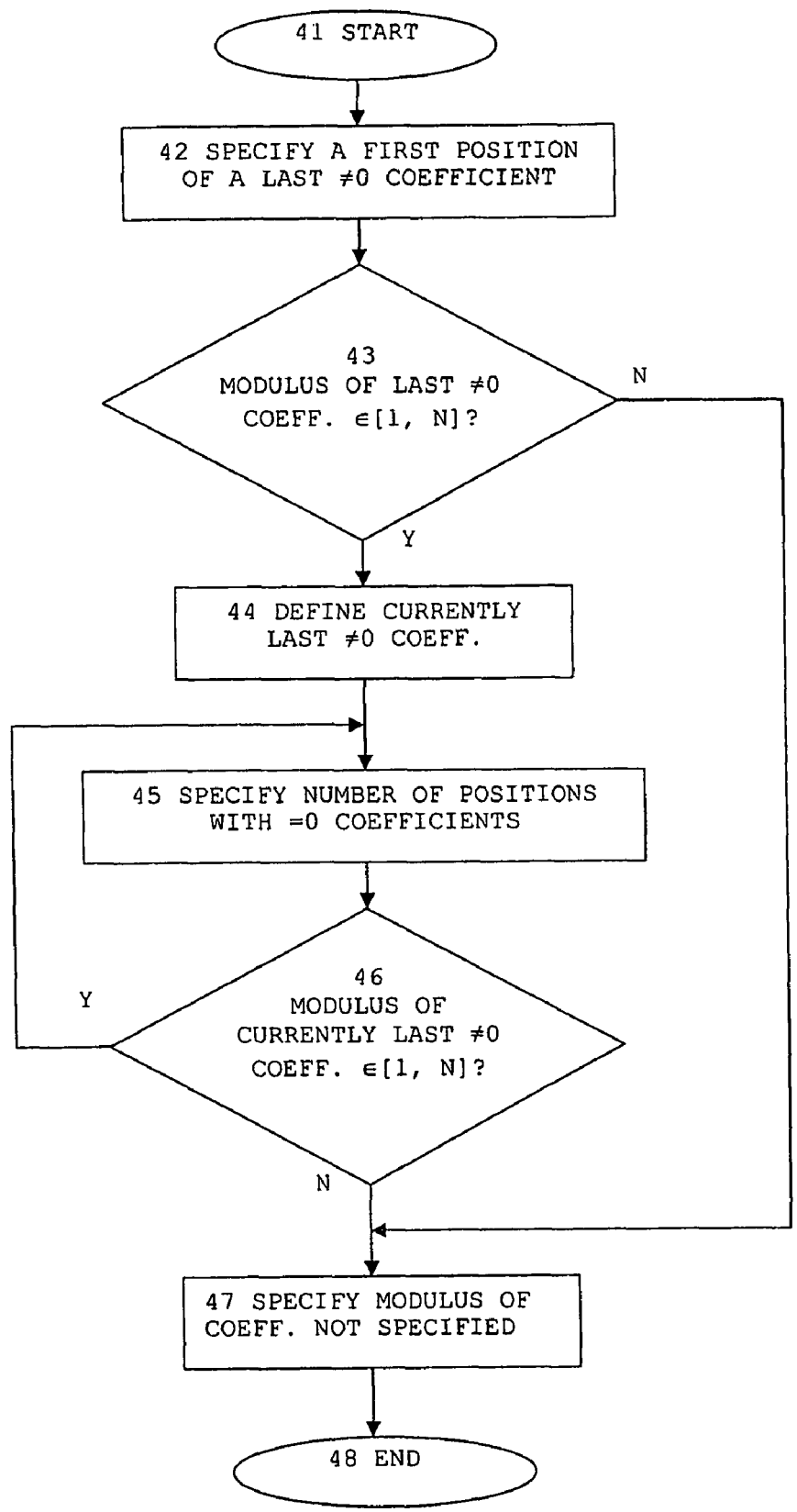
FIG. 4 is a flow chart schematically illustrating a first embodiment of a method in accordance with the invention.

FIG. 4 is a flow chart schematically illustrating an embodiment of a method in accordance with the invention.

The flow chart in FIG. 4 schematically illustrates a method for providing a simplified entropy coding procedure in video coding of quantized transform coefficients representing a block of residual pixel values in a macroblock. In the method, the quantized transform coefficients are assigned to positions within the block of an increasing order.

The method starts at the initiating step 41.

Next, the first position specifying step 42 is performed. In this step 42 it is determined if modulus of the last non-zero coefficient is among [1,n], or an indication of >n if modulus of said last non-zero coefficient is greater than n.

Further in step 42, if the above test is true, a first position of a last non-zero coefficient within the macroblock together with modulus of said last non-zero coefficient is specified as an event of among a number of possible events in a first Variable Length Code (VLC).

Next, in the determining step 43, it is determined if modulus of said last non-zero coefficient is among [1,n].

If the result of this determining step 43 is true, the last non-zero coefficient is defined in the defining step 44 as a currently last non-zero coefficient.

Next, the number of positions specification step 45 is performed. In this step, the number of positions with zero coefficients between said currently last non-zero coefficient and a next non-zero coefficient within the block, directed towards decreasingly position order, is specified together with modulus of said next non-zero coefficient, if modulus of said next non-zero coefficient is among [1,n] or an indication of >n if modulus of said next non-zero coefficient is greater than n as an event of among a number of possible events in a second VLC. The step 45 also comprises to define said next non-zero coefficient to be said currently last non-zero coefficient.

If, on the other hand, the result of the determining step 43 was false, i.e. if modulus of the currently last non-zero coefficient is greater than n, the modulus of coefficients specifying step 47 (below) is performed.

Subsequent to the accomplishment of the number of positions specifying step 45, the determining step 46 is performed. In the determining step 46, it is determined if modulus of said currently last non-zero coefficient is among [1,n].

If the result of the determining step 46 is true, the number of positions specification step 45 is repeated.

Else, if the result of the determining step 46 is false, i.e. if modulus of the currently last non-zero coefficient is greater than n, the modulus of coefficients specifying step 47 is performed.

The modulus of coefficients specifying step 47 is also entered if the result of the determining step 43 was false, i.e. if the modulus of the last non-zero coefficient is greater than n.

In the modulus of coefficients specifying step 47, modulus of each coefficient not specified in the above steps and corresponding positions according to one or more VLCs, are specified.

Advantageously, the modulus of coefficients specifying step 47 further includes that a first or last ordered coefficient of said coefficients not specified in the previous steps 41-46 is specified according to a third VLC having possible modulus values of [n+1,→], while the remaining ones of said coefficients not specified in step I-III are specified according to a fourth VLC having possible modulus values of [0,→].

Advantageously, the constant n has a value of 1.

Advantageously, the first VLR depends on one or more neighbor blocks with a fixed position relative to said block if said one or more neighbor blocks are within the macroblock.

The process ends at the terminating step 48.

Figure 5:
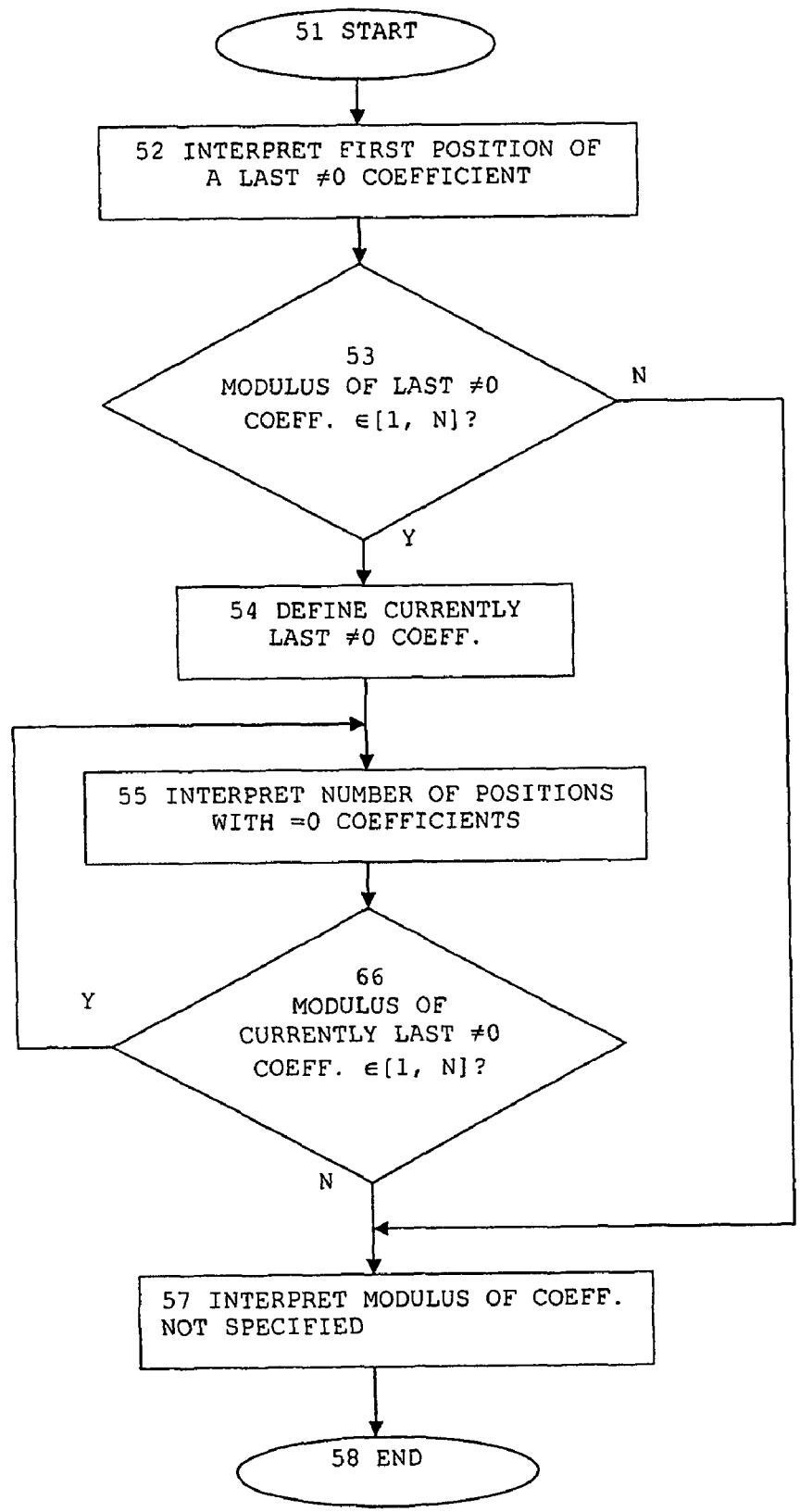
FIG. 5 is a flow chart schematically illustrating a second embodiment of a method in accordance with the invention, Table 1 shows an example of a VLC code, Table 2 shows an example of a LEVEL mode, Table 3 shows an example of a RUN mode.

FIG. 5 is a flow chart schematically illustrating a second embodiment of a method in accordance with the invention.

The flow chart in FIG. 5 schematically illustrates a method for providing simplified entropy decoding procedure in video decoding of quantized transform coefficients representing a block of residual pixel values in a macroblock, wherein the coefficients are assigned to positions within the block of an increasing order.

The method starts at the initiating step 51.

Next, the first position interpreting step 52 is performed. In this step 52 it is determined if modulus of the last non-zero coefficient is among [1,n], or an indication of >n if modulus of said last non-zero coefficient is greater than n.

If this is true, a first position of a last non-zero coefficient within the macroblock together with modulus of said last non-zero coefficient is interpreted as an event of among a number of possible events in a first Variable Length Code (VLC).

Next, in the determining step 53, it is determined if modulus of said last non-zero coefficient is among [1,n].

If the result of this determining step 53 is true, the last non-zero coefficient is defined in the defining step 54 as a currently last non-zero coefficient.

Next, the number of positions interpreting step 45 is performed. In this step, the number of positions with zero coefficients between said currently last non-zero coefficient and a next non-zero coefficient within the block, directed towards decreasingly position order, is interpreted together with modulus of said next non-zero coefficient, if modulus of said next non-zero coefficient is among [1,n] or an indication of >n if modulus of said next non-zero coefficient is greater than n as an event of among a number of possible events in a second VLC. The step 55 also comprises to define said next non-zero coefficient to be said currently last non-zero coefficient.

If, on the other hand, the result of the determining step 53 was false, i.e. if modulus of the currently last non-zero coefficient is greater than n, the modulus of coefficients interpreting step 57 (below) is performed.

Subsequent to the accomplishment of the number of positions interpreting step 55, the determining step 56 is performed. In the determining step 56, it is determined if modulus of said currently last non-zero coefficient is among [1,n].

If the result of the determining step 56 is true, the number of positions interpreting step 55 is repeated.

Else, if the result of the determining step 56 is false, i.e. if modulus of the currently last non-zero coefficient is greater than n, the modulus of coefficients interpreting step 57 is performed.

The modulus of coefficients interpreting step 57 is also entered if the result of the determining step 53 was false, i.e. if the modulus of the last non-zero coefficient is greater than n.

In the modulus of coefficients interpreting step 57, modulus of each coefficient not specified in the above steps and corresponding positions according to one or more VLCs, are interpreted.

Advantageously, the modulus of coefficients interpreting step 57 further includes that a first or last ordered coefficient of said coefficients not interpreted in the previous steps 51-56 is interpreted according to a third VLC having possible modulus values of $[n+1,\rightarrow]$, while the remaining ones of said coefficients not interpreted in step I-III are interpreted according to a fourth VLC having possible modulus values of $[0,\rightarrow]$.

Advantageously, the constant n has a value of 1.

Advantageously, the first VLR depends on one or more neighbor blocks with a fixed position relative to said block if said one or more neighbor blocks are within the macroblock.

The process ends at the terminating step 58.

The invention claimed is:

1. A method for providing a simplified entropy coding procedure in video coding of quantized transform coefficients representing a block of residual pixel values in a macroblock, wherein the coefficients are assigned to positions within the block of an increasing order,
the method comprising the steps of:
  I specifying a first position of a last non-zero coefficient within the block together with modulus of said last non-zero coefficient if modulus of last non-zero coefficient is among [1,n] or an indication of >n if modulus of said last non-zero coefficient is greater than n as an event of among a number of possible events in a first Variable Length Code (VLC),
  II if modulus of said last non-zero coefficient is among [1,n], defining said last non-zero coefficient as a currently last non-zero coefficient, and
    a specifying the number of positions with zero coefficients between said currently last non-zero coefficient and a next non-zero coefficient within the block, directed towards decreasingly position order, together with modulus of said next non-zero coefficient if modulus of said next non-zero coefficient is among [1,n] or an indication of >n if modulus of said next non-zero coefficient is greater than n as an event of among a number of possible events in a second VLC, and defining said next non-zero coefficient to be said currently last non-zero coefficient,
    b repeating step a if modulus of said currently last non-zero coefficient is among [1,n]
  III if modulus of said last or currently last non-zero coefficient is greater than n,
    a specifying modulus of each coefficients not specified in step I-II and corresponding positions according to one or more VLCs.

2. A method according to claim 1,
wherein step IIIa further includes that a first or last ordered coefficient of said coefficients not specified in step I-III is specified according to a third VLC having possible modulus values of $[n+1,\rightarrow]$, while the remaining ones of said coefficients not specified in step I-III are specified according to a fourth VLC having possible modulus values of $[0,\rightarrow]$.

3. A method according to claim 1 or 2,
wherein n=1.

4. A method according to claim 1 or 2,
wherein said first VLR depends on one or more neighbor blocks with a fixed position relative to said block if said one or more neighbor blocks are within the macroblock.

5. A method according to claim 3,
wherein said first VLR depends on one or more neighbor blocks with a fixed position relative to said block if said one or more neighbor blocks are within the macroblock.

6. A method for providing simplified entropy decoding procedure in video decoding of quantized transform coefficients representing a block of residual pixel values in a macroblock, wherein the coefficients are assigned to positions within the block of an increasing order,
the method comprising the steps of:
  I interpreting a first position of a last non-zero coefficient within the block together with modulus of said last non-zero coefficient if modulus of last non-zero coefficient is among [1,n] or an indication of >n if modulus of said last non-zero coefficient is greater than n as a specific event of among a number of possible events in a first Variable Length Code (VLC),
  II if modulus of said last non-zero coefficient is among [1,n], defining said last non-zero coefficient as a currently last non-zero coefficient, and
    a interpreting the number of positions with zero coefficients between said currently last non-zero coefficient and a next non-zero coefficient within the block, directed towards decreasingly position order, together with a modulus of said next non-zero coefficient if modulus of said next non-zero coefficient is among [1,n] or an indication of >n if modulus of said next non-zero coefficient is greater than n as a specific event of among a number of possible events in a second VLC, and defining said next non-zero coefficient to be said currently last non-zero coefficient,
  b repeating step a if modulus of said currently last non-zero coefficient is among [1,n]
III if modulus of said last or currently last non-zero coefficient is greater than n,
  a interpreting modulus of each coefficients not specified in step I-II and corresponding positions according to one or more VLCs.

7. A method according to claim 6,
wherein step IIIa further includes that a first or last ordered coefficient of said coefficients not interpreted in step I-III is interpreted according to a third VLC having possible modulus values of [n+1,→], while the remaining ones of said coefficients not interpreted in step I-III are interpreted according to a third VLC having possible modulus values of [0,→].

8. A method according to claim 6 or 7,
wherein n=1.

9. A method according to claim 6 or 7,
wherein said first VLR depends on one or more neighbor blocks with a fixed position relative to said block if said one or more neighbor blocks are within the macroblock.

10. A method according to claim 8,
wherein said first VLR depends on one or more neighbor blocks with a fixed position relative to said block if said one or more neighbor blocks are within the macroblock.

\* \* \* \* \*